(12) United States Patent
DeLuca et al.

(10) Patent No.: US 9,385,978 B2
(45) Date of Patent: *Jul. 5, 2016

(54) GENERATING AND/OR PROVIDING ACCESS TO A MESSAGE BASED ON PORTIONS OF THE MESSAGE INDICATED BY A SENDING USER

(71) Applicant: International Business Machines Corporation, Armonk, NY (US)

(72) Inventors: Lisa Seacat DeLuca, San Francisco, CA (US); Brian Daniel Goodman, West Redding, CT (US)

(73) Assignee: International Business Machines Corporation, Armonk, NY (US)

( * ) Notice: Subject to any disclaimer, the term of this patent is extended or adjusted under 35 U.S.C. 154(b) by 252 days.

This patent is subject to a terminal disclaimer.

(21) Appl. No.: 14/292,032

(22) Filed: May 30, 2014

(65) Prior Publication Data

US 2014/0280653 A1 Sep. 18, 2014

Related U.S. Application Data

(63) Continuation of application No. 13/212,626, filed on Aug. 18, 2011, now Pat. No. 8,769,024.

(51) Int. Cl.
*G06F 15/16* (2006.01)
*H04L 12/58* (2006.01)
*H04L 29/06* (2006.01)

(52) U.S. Cl.
CPC .......... *H04L 51/046* (2013.01); *H04L 12/5855* (2013.01); *H04L 12/581* (2013.01); *H04L 63/123* (2013.01); *H04L 2209/60* (2013.01)

(58) Field of Classification Search
CPC ... H04L 12/58; H04L 12/581; H04L 12/5855; H04L 2209/60; H04L 63/123; H04W 28/06
USPC .......................................................... 709/206
See application file for complete search history.

(56) References Cited

U.S. PATENT DOCUMENTS

| | | | |
|---|---|---|---|
| 6,915,332 B1 * | 7/2005 | Zdepski | G06Q 10/107 709/206 |
| 7,159,188 B2 * | 1/2007 | Stabb | G06F 3/0481 715/786 |
| 7,720,916 B2 | 5/2010 | Fisher et al. | |
| 8,352,573 B2 * | 1/2013 | Chandra | G06F 17/30889 709/218 |
| 2004/0205633 A1 | 10/2004 | Martinez et al. | |
| 2007/0250576 A1 | 10/2007 | Kumar et al. | |
| 2008/0005247 A9 | 1/2008 | Khoo | |
| 2011/0154252 A1 | 6/2011 | Canfield et al. | |
| 2012/0042024 A1 * | 2/2012 | Kirshenboim | H04L 51/18 709/206 |
| 2013/0007648 A1 * | 1/2013 | Gamon | G06Q 10/109 715/771 |

* cited by examiner

*Primary Examiner* — John Breene
*Assistant Examiner* — Eyob Hagos
(74) *Attorney, Agent, or Firm* — BainwoodHuang (57) ABSTRACT

Message processing is disclosed that includes detecting an action by a sending user selecting at least one portion of a message. An indication of the selected portion of the message is stored in the message, and the message transmitted to at least one message recipient. Contextually related content from the message for the selected portion may also be indicated in the message. The selected portion or portions of the message may be displayed to a recipient user, and selection by the recipient user of a portion of the message selected by said sending user may be detected. Contextually related content may be retrieved from the message in response detecting the recipient user's selection of the portion of the message selected by said sending user, and the contextually related content displayed to the recipient together with the portion of the message selected by said sending user.

12 Claims, 8 Drawing Sheets

GENERATING AND/OR PROVIDING ACCESS TO A MESSAGE BASED ON PORTIONS OF THE MESSAGE INDICATED BY A SENDING USER

BACKGROUND OF THE INVENTION

The present invention relates generally to electronic communication systems, such as electronic mail ("email"), and more specifically to generating and providing access to a message using portions of the message indicated by a sending user.

BRIEF SUMMARY

Message processing is disclosed that may include detecting a sending user selecting at least one portion of a message. An indication of the selected portion of the message may be stored in the message, and the message transmitted to at least one message recipient. The indication of the selected portion of the message may be stored in the header and/or body of the message. Indications of content in the message that is contextually related to the selected portion may also be stored in and transmitted in the message.

Selected portions of the message may be retrieved from memory and displayed without displaying other portions of the message. Selection by a recipient user of a portion of the message selected by the sending user may be detected. Contextually related content may be retrieved from the message in response to detection of a recipient user's selecting a portion of the message selected by said sending user. The contextually related content may be displayed to the recipient user together with the portion of the message selected by said sending user.

BRIEF DESCRIPTION OF THE SEVERAL VIEWS OF THE DRAWINGS

In order to facilitate a fuller understanding of the present invention, reference is now made to the appended drawings. These drawings should not be construed as limiting the present invention, but are intended to be exemplary only.

DETAILED DESCRIPTION

Figure 1:
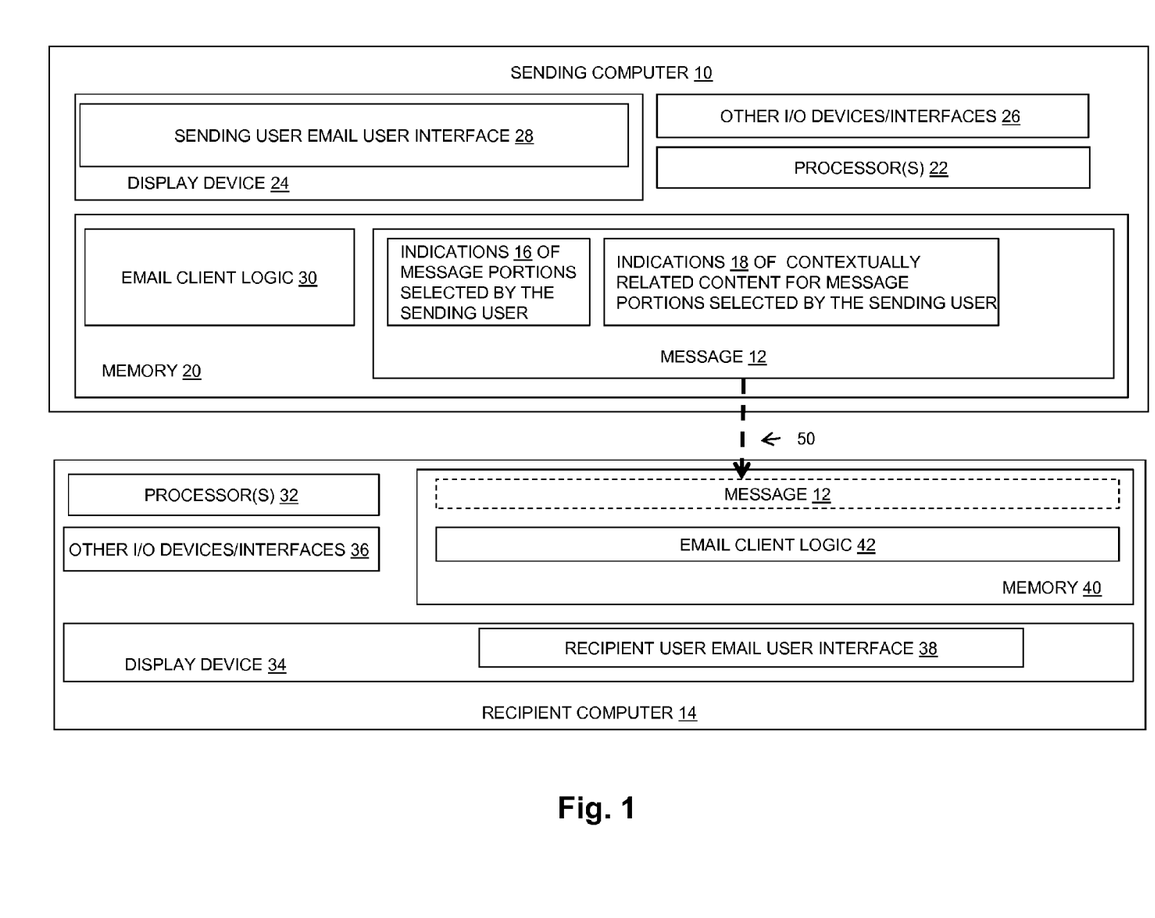
FIG. 1 is a first block diagram showing an example of the structure of components in an illustrative embodiment.

FIG. 1 is a first block diagram showing an example of structure of components in an illustrative embodiment. As shown in FIG. 1, a Sending Computer 10 includes one or more Processor(s) 22, a Memory 20, a Display Device 24, and other I/O Devices and/or Interfaces 26. In the example of FIG. 1, the Memory 20 stores Electronic Mail ("Email") Client Logic 30 and a Message 12. The Message 12 may, for example, be generated at least in part by the Email Client Logic 30. A Sending User Email User Interface 28 is displayed through the Display Device 24, and may be generated at least in part by the Email Client Logic 30. In the example of FIG. 1, the Message 12 includes Indications 16 of Message Portions Selected by the Sending User and Indications 18 of Contextually Related Content for Message Portions Selected by the Sending User.

During operation of the embodiment shown in FIG. 1, the Email Client Logic 30 stores the Indications 16 of Message Portions Selected by the Sending User in response to detecting indications from a user of Sending Computer 10 (the "sending user") of one or more portions of the Message 12. Such detecting may, for example, be through the Sending User Email User Interface 28. The Indications 18 of Contextually Related Content for Message Portions Selected by the Sending User may also be calculated and stored in the Message 12 by the Email Client Logic 30. For example, the Indications 18 of Contextually Related Content for Message Portions Selected by the Sending User may be calculated or otherwise determined based on indications received from the sending user of contextually related content in the Message 12 for specific corresponding selected portions of the Message 12. Alternatively, or in addition, the Indications 18 of Contextually Related Content for Message Portions Selected by the Sending User may be calculated or otherwise determined automatically based in whole or in part on system or user configuration settings.

Further during operation of the embodiment shown in FIG. 1, the Email Client Logic 30 may cause the Message 12 to be transmitted 50 from Sending Computer 10 to Recipient Computer 14, and stored in Memory 40 of Recipient Computer 14. In addition to the Memory 40, the Recipient Computer 14 is shown including one or more Processor(s) 32, a Display Device 34, and other I/O Devices and/or Interfaces 36. Email Client Logic 42 processes Message 12 and generates Recipient User Email User Interface 38 based at least in part on Message 12, as further described below.

While for purposes of concise illustration FIG. 1 shows the Sending Computer 10 transmitting the Message 12 directly to the Recipient Computer 14, those skilled in the art will recognize that one or more server computer systems may be located between the Sending Computer 10 and the Recipient Computer 14. The Sending Computer 10, Recipient Compute 14 and any such servers may be communicably connected using any specific kind of data communication network(s) and/or communication protocol(s).

The Sending Computer 10 and Recipient Computer 14 of FIG. 1 may each be embodied as or include any specific type of computer system and/or intelligent electronic device, such as a desktop, laptop, or palmtop computer system, or a personal digital assistant, cell phone, and/or other intelligent electronic device. The Display Devices 24 and 34 may be any specific type of display device capable of displaying a graphical user interface, such as a liquid crystal display (LCD), cathode ray tube (CRT), interferometric modulator display (IMOD), light emitting diode (LED), or other specific type of display device.

Those skilled in the art will recognize that the Email Client Logic 30 and Email Client Logic 42 may be embodied using software or firmware, such as computer application program code, operating system program code, and/or middleware, and/or wholly or partly using digital hardware components, such as application specific integrated circuits (ASICs), field-programmable gate arrays (FPGAs), and the like, and/or combinations of hardware and/or software and/or firmware. Those skilled in the art will further recognize that the Processor(s) 22 and 32 may include one or more processors of any specific type, and that the Memory 20 and 40 may be embodied as any specific type of program code or data storage, such as volatile or non-volatile memory, operable to store program code executable on such processors and associated data.

Figure 2:
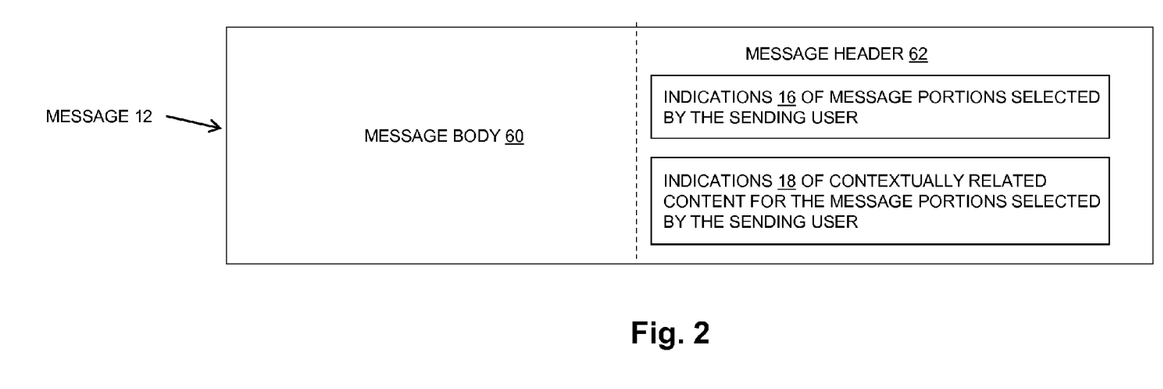
FIG. 2 is a block diagram showing a first example of the structure of a message in an illustrative embodiment.

FIG. 2 is a block diagram showing a first example of the structure of Message 12 in an illustrative embodiment. As shown in the example of FIG. 2, the Indications 16 of Message Portions Selected by the Sending User may be stored in a Message Header 62 of Message 12. For example, the Indications 16 of Message Portions Selected by the Sending User may include copies of the message portions selected by the sending user and stored in the Message Header 62. The Indications 16 of Message Portions Selected by the Sending User may include one or more MIME header fields or the like.

The Indications 18 of Contextually Related Content for Message Portions Selected by the Sending User may also be stored in Message Header 62 of Message 12. Accordingly, the Indications 18 of Contextually Related Content for Message Portions Selected by the Sending User may include copies of the contextually related content stored in the Message Header 62. The Indications 18 of Contextually Related Content for Message Portions Selected by the Sending User may include one or more MIME header fields or the like.

Figure 3:
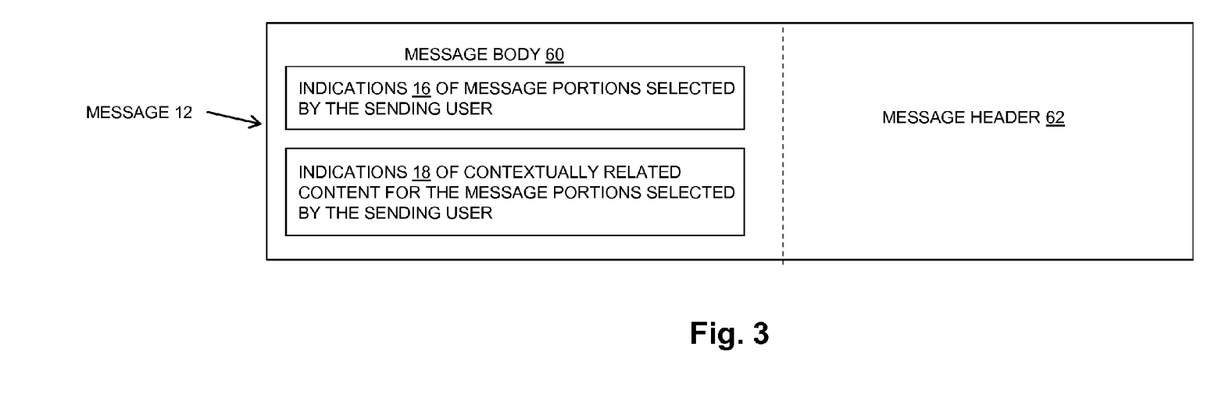
FIG. 3 is a block diagram showing a second example of the structure of a message in an illustrative embodiment.

FIG. 3 is a block diagram showing a second example of the structure of Message 12 in an illustrative embodiment. As shown in the example of FIG. 3, the Indications 16 of Message Portions Selected by the Sending User may be stored in a Message Body 60 of Message 12. For example, the Indications 16 of Message Portions Selected by the Sending User may include or consist of tags (e.g. HTML, XML, or any other specific type of tags) located proximately to message portions selected by the sending user within the Message Body 60 (e.g. preceding and/or following the message portions selected by the sending user). The Indications 16 of Message Portions Selected by the Sending User may include tags in the Message Body 60 that create one or more hyperlinks (aka "links") having the message portions selected by the sending user as hypertext for the respective link. Each such hyperlink may, for example, link to a location storing the respective selected message portion, or to a location of the beginning of contextually related content associated with the respective selected message portion.

As also shown in FIG. 3, the Indications 18 of Contextually Related Content for Message Portions Selected by the Sending User may also be stored in Message Body 60. For example, Indications 18 of Contextually Related Content for Message Portions Selected by the Sending User may include or consist of tags (e.g. HTML, XML, or any other specific type of tags) located proximately to the contextually related content within the Message Body 60 (e.g. preceding and/or adjacent to the beginning and/or following and/or adjacent to the end of the contextually related content). The Indications 18 of Contextually Related Content for Message Portions Selected by the Sending User may consist of and/or include tags having values that cause the contextually related content to be hidden until the values are changed, e.g. in response to actions by the recipient use, as further described below.

In either the example of FIG. 2 or the example of FIG. 3, the Message 12 transmitted from Sending Computer 10 and/or received by Recipient Computer 14 may or may not include the complete contents of the message entered by the sending use. For example, Message 12 may include only the message portions selected by the sending user, and/or the contextually related content for each of the message portions selected by the sending user. In one embodiment, the Message 12 includes only Indications 16 of Message Portions Selected by the Sending User, but not any other part of the message contents (e.g. no other text or other content entered by the sending user into the Message 12). Alternatively, Message 12 may include Indications 16 of Message Portions Selected by the Sending User, and Indications 18 of Contextually Related Content for Message Portions Selected by the Sending User, but no other part of the message contents (e.g. no other text or other content entered by the sending user into the Message 12). In one embodiment, a recipient user may indicate by way of one or more configuration settings or the like that the complete contents of messages transmitted to that user are to be sent to the local computer (e.g. Recipient Computer 14), or that only the portions selected by the sending user and/or contextually related content of such selected are to be initially sent.

While specific techniques for providing the Indications 16 of Message Portions Selected by Sending User, and Indications 18 of Contextually Related Content for Message Portions Selected by the Sending User in the Message 12 are described above with reference to FIGS. 1-3, the disclosed system is not limited to those specific techniques. Those skilled in the art will therefore recognize that embodiments using copies of the message portions selected by the sending user and/or tags as the Indications 16 of Message Portions Selected by Sending User, and/or using copies of the contextually related content and/or tags as Indications 18 of Contextually Related Content for Message Portions Selected by the Sending User are only examples of possible embodiments. Any specific alternative and/or additional techniques may be used with regard to providing the Indications 16 of Message Portions Selected by Sending User and Indications 18 of Contextually Related Content for Message Portions Selected by the Sending User in alternative embodiments of the Message 12. Alternative and/or additional techniques that may be used in this regard include but are not limited to one or more indications of a start and/or an end of a text selection contained within Message 12 (e.g. stored as a byte range start and stop), one or more indications of a region selected within an image (e.g. a region of an embedded image within Message 12), and/or any other specific types of indications as may be appropriate for a given embodiment.

Figure 4:
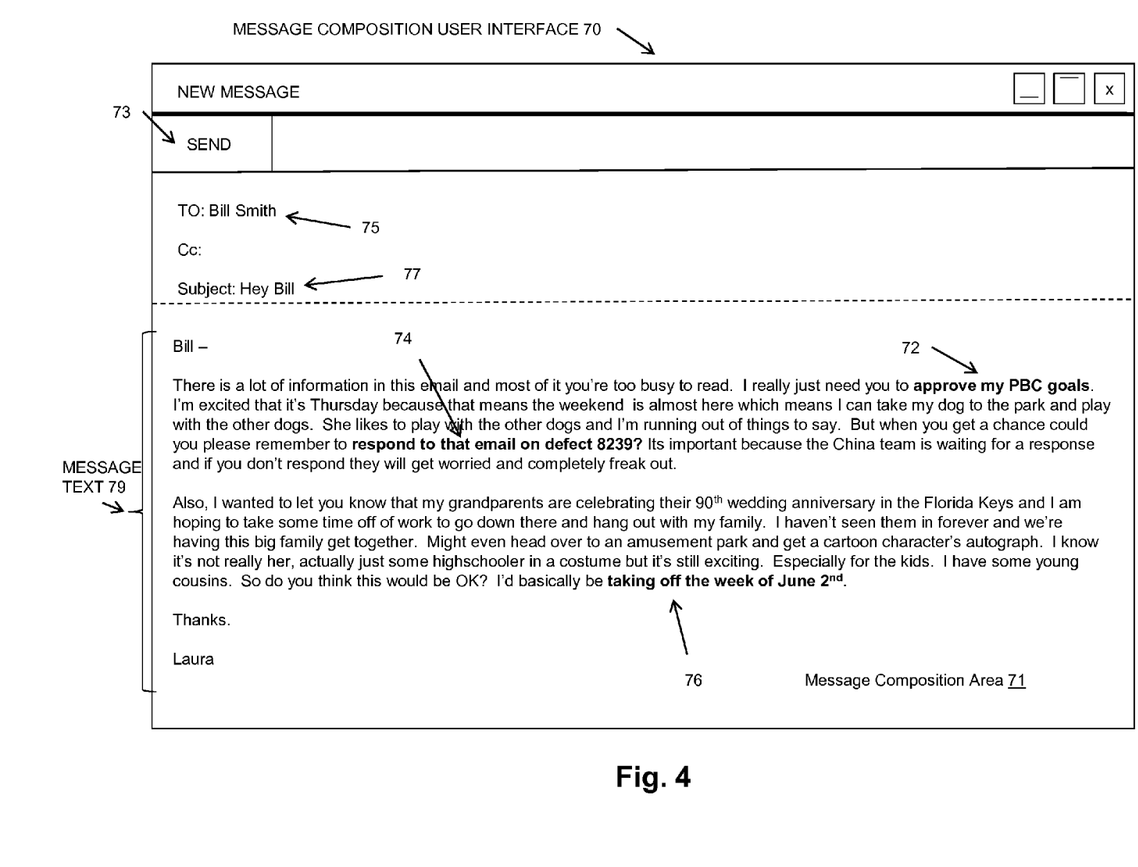
FIG. 4 is a simplified screen shot showing an example of at least a portion of a message composition user interface generated in an illustrative embodiment.

FIG. 4 is a simplified screen shot showing an example of at least a portion of a Message Composition User Interface 70 generated in an illustrative embodiment. The Message Composition User Interface 70 may be at least a part of the Sending User Email User Interface 28 shown in FIG. 1. As such, the Message Composition User Interface 70 may at least in part be generated by the Email Client Logic 30, and the operations described below with reference to FIG. 4 may also be performed by the Email Client Logic 30.

As shown in FIG. 4, the Message Composition User Interface 70 includes a Message Composition Area 71 into which a sending user enters (e.g. types) content into a message to be sent to one or more recipient computers and associated users (aka "recipients"). The recipient(s) for the message is/are indicated in a TO: field 75, shown for purposes of illustration containing the recipient identifier "Bill Smith". The subject for the message is indicated in a Subject: field 77, containing the subject text "Hey Bill". In the example of FIG. 4, a sending user has entered Message Text 79 into the Message Composition Area 71. The sending user has selected message portions 72, 74 and 76 from the Message Text 79, for example by bolding those portions of the Message Text 79. When the sending user subsequently clicks on the Send button 73, the disclosed system determines the locations of the portions of the Message Text 79 selected by the sending user, stores indications of the selected portions in the message, and transmits the message to the message recipient(s) (e.g. Bill Smith). While in the example of FIG. 4 the selected portions are detected by scanning the Message Text 79 for portions of the message contents that have been bolded by the sending user within the Message Composition Area 71, the disclosed system is not limited to that specific approach to determining selected portions. Accordingly, any appropriate technique for detecting portions of the message in the Message Composition Area 71 selected by the sending user may alternatively or additionally be used. Other possible techniques for detecting portions of the message selected by the sending user include but are not limited to detecting any message portion having been set by the sending user to some predetermined font, style, color or format, and/or detecting any portion having been otherwise "marked" as important by the sending user using a predetermined command or graphical user interface device such as a virtual "pen" or the like, and/or by detecting portions of the message that have been indicated to be important by the sending user in any other specific way as may be appropriate for a given embodiment or configuration.

The disclosed system may further operate to determine contextually related content associated with each of the message portions 72, 74 and 76, in response to express selection of such related content by the sending user. Any appropriate technique for detecting content within the Message Composition Area 71 that is indicated by the sending user as contextually related to a selected portion may be used, including but not limited to those techniques described above for detecting message portions selected by the sending user. For example, detecting a second predetermined font, style, color or format, and/or detecting a portion having been "marked" as contextually related content by the sending user using a second predetermined command, etc.

A determination of contextually related content for a given selected portion may alternatively, or in addition, include automatic determination of such related content. Such a determination may include finding a location of a selected portion within the message, and then finding contextually related information that is located proximately to the selected portion within the message. For example, the disclosed system may be embodied such that the contextually related information for a given selected message portion is determined based at least in part on a configuration setting or settings (e.g. set by the sending user, the recipient user, and/or by a system administrator) indicating a number of lines of text preceding and/or following the line(s) containing the selected portion. In such an embodiment, if the number of lines of contextually related information were configured to be equal to one line preceding the selected portion and one line following the selected portion, then the contextually related information for selected portion 74 (i.e. "respond to that email on defect 8239?") would consist of the other text in the line containing the selected portion (i.e. "you please remember to . . . . Its important because the china team is waiting for a response"), the text in the line preceding the line containing the selected portion, (i.e. "with the other dogs. She likes to play with the other dogs and I'm running out of things to say. But when you get a chance could"), and the line following the line containing the selected portion (i.e. "and if you don't respond they will get worried and completely freak out.").

Determining the contextually related information for a portion of the message selected by the sending user based on a configuration setting indicating some number of lines of text preceding and following the line(s) containing the selected portion is only one possible technique for automatically determining the contextually related content for a portion of the message selected by the sending user. The contextually related information for a selected portion of the message may be automatically determined in any other way as may be appropriate for a given embodiment or configuration. Alternative techniques in this regard include but are not limited to determining contextually related information for a portion of the message selected by the sending user based on one or more configuration setting indicating some number of sentences of text preceding and/or following the sentence(s) containing the selected portion, and/or responsive to an express indication or selection by the sending user of content to be considered contextually related to given selected portion.

FIGS. 5-8 show examples of graphical user interface components that may be generated within the Recipient User Email User Interface 38 by the Email Client Logic 42 within the Recipient Computer 14 of FIG. 1, for a user of the Recipient Computer 14 (aka the "recipient user" or "recipient"). Accordingly, the operations described below with reference to FIGS. 5-8 may also be performed by the Email Client Logic 42.

Figure 5:
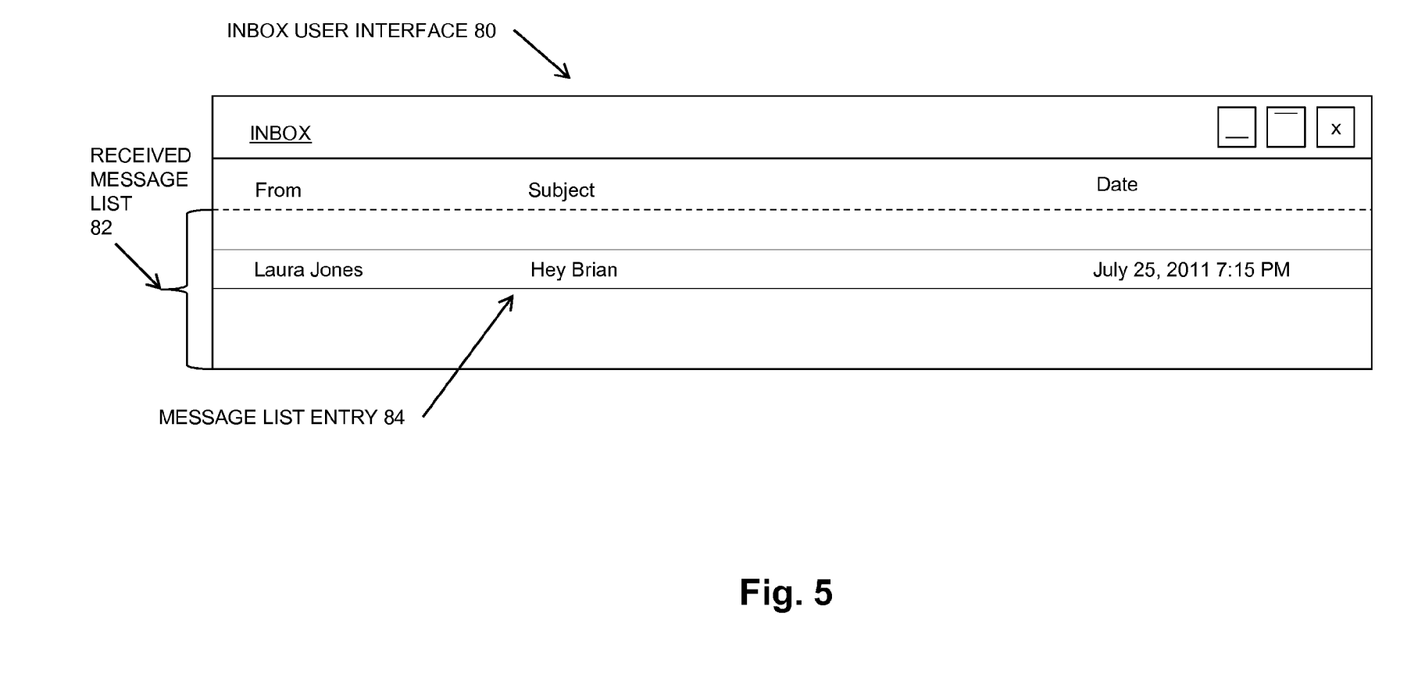
FIG. 5 is a simplified screen shot showing a first example of at least a portion of an inbox user interface generated in an illustrative embodiment.

FIG. 5 is a simplified screen shot showing a first example of at least a portion of an inbox user interface generated in an illustrative embodiment. As shown in FIG. 5, an Inbox User Interface 80 includes a Received Message List 81, which includes one or more entries representing corresponding messages received for the recipient user. In the example of FIG. 5, the Received Message List 81 includes a Message List Entry 84 representing the Message 12, as received by the Recipient Compute 14 of FIG. 1. As further shown in FIG. 6, in response to detecting that the recipient user has selected the Message List Entry 84 in some way and/or initiated a predetermined command, an embodiment of the disclosed system displays a Selected Portions List 90. For example, the disclosed system may display Selected Portions List 90 in response to detecting that the recipient user has hovered the cursor over, clicked, double-clicked or right-clicked on Message List Entry 84, and/or selected a command from a resulting context or "pop-up" menu, or selected a command from any other specific type of command menu structure or the like within the user interface. The Selected Portions List 90 is generated based on the Indications 16 of Message Portions Selected by the Sending User from the Message 12, and contains an entry for each of the portions of the Message 12 selected by the sending user (e.g. an entry for each of the selected portions 72, 74 and 76 shown in FIG. 4). The Selected Portions List 90 is an example of how Indications 16 of Message Portions Selected by the Sending User from the Message 12 may be displayed without displaying any other portions of the Message 12 (i.e. without displaying any non-selected portions of the Message 12 in the Selected Portions List 90). Each entry in the Selected Portions List 90 may, for example, contain a hyperlink for a corresponding one of the portions of the Message 12 selected by the sending user. In such an embodiment, each portion selected portion of the Message 12 selected by the sending user may be displayed as a hyperlink in an entry within Selected Portions List 90. Further in such an embodiment, each entry in the Selected Portions List 90 may link to the position of the corresponding selected portion within Message 12, and clicking on such an entry in the Selected Portions List 90 by the recipient user may result in the disclosed system displaying the corresponding selected portion at its location within the Message 12. Alternatively, each entry in the Selected Portions List 90 may link to the position of contextually related content for the corresponding selected portion within Message 12.

Figure 7:
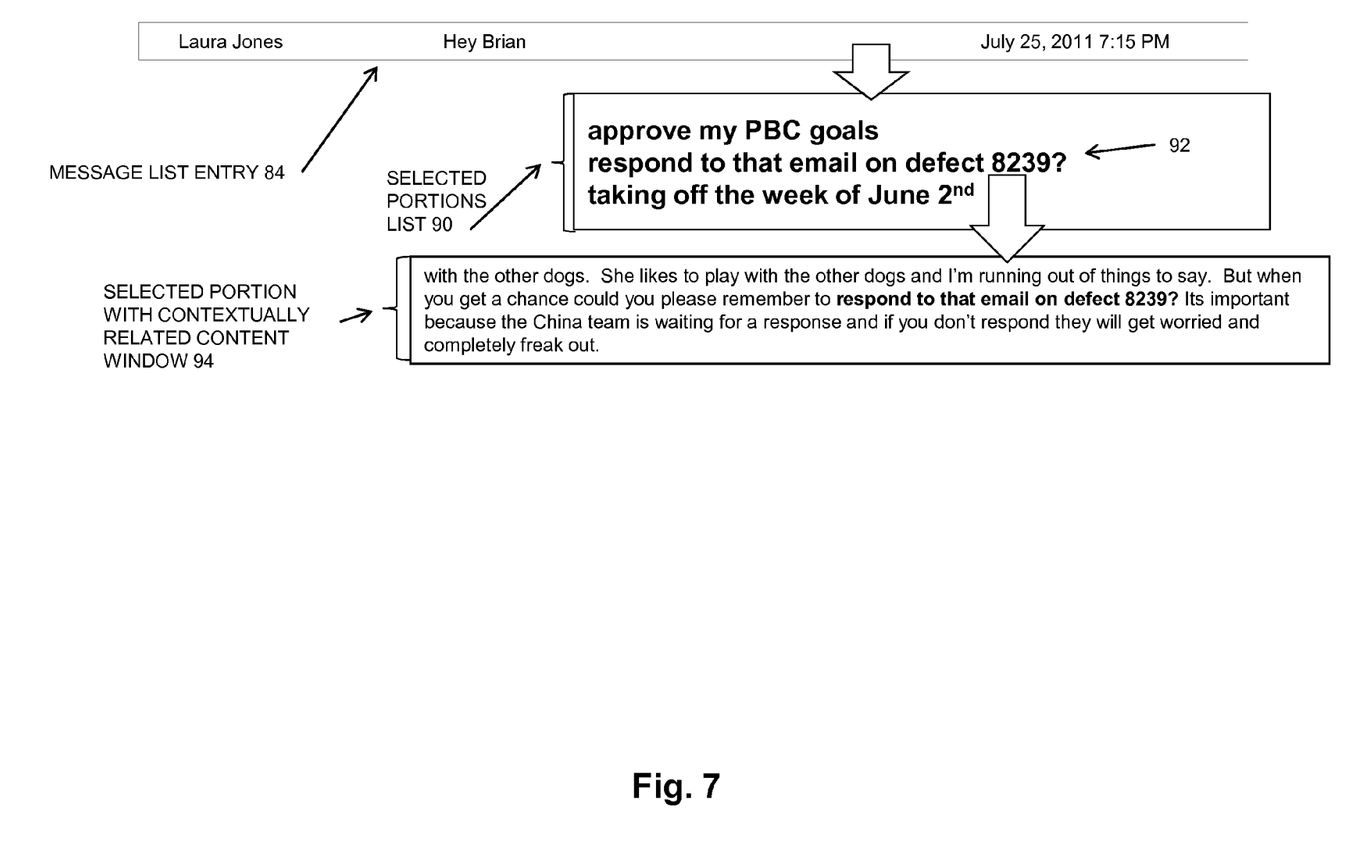
FIG. 7 is a simplified screen shot showing a third example of at least a portion of an inbox user interface generated in an illustrative embodiment.

As further shown in FIG. 7, in response to detecting that the recipient user has in some way selected entry 92 within the Selected Portions List 90, and/or initiated a predetermined command, an embodiment of the disclosed system displays a Selected Portion with Contextually Related Content Window 94. For example, the disclosed system may display Selected Portion with Contextually Related Content Window 94 in response to detecting that the recipient user has hovered the cursor over, clicked, double-clicked or right-clicked on entry 92, and/or selected a command from a resulting context or "pop-up" menu, or selected a command from any other specific type of command menu structure or the like within the user interface. The Selected Portion with Contextually Related Content Window 94 contains the portion of Message 12 selected by the sending user that corresponds to entry 92, and the contextually related content from Message 12 associated with that selected portion. For purposes of illustration, FIG. 7 shows an embodiment consistent with the embodiment of FIG. 4, in which the number of lines of contextually related information are configured to be equal to one line preceding the selected portion and one line following the selected portion. The contextually related information for entry 92 (corresponding to the selected portion "respond to that email on defect 8239?") accordingly consists of the other text in the line containing the corresponding selected portion (i.e. "you please remember to . . . . Its important because the china team is waiting for a response"), the text in the line preceding the line containing the selected portion, (i.e. "with the other dogs. She likes to play with the other dogs and I'm running out of things to say. But when you get a chance could"), and the line following the line containing the selected portion (i.e. "and if you don't respond they will get worried and completely freak out."). The complete contents of Selected Portion with Contextually Related Content Window 94, including the corresponding selected portion and the associated contextually related content, is therefore: "with the other dogs. She likes to play with the other dogs and I'm running out of things to say. But when you get a chance could you please remember to respond to that email on defect 8239? Its important because the China team is waiting for a response and if you don't respond they will get worried and completely freak out."

Figure 8:
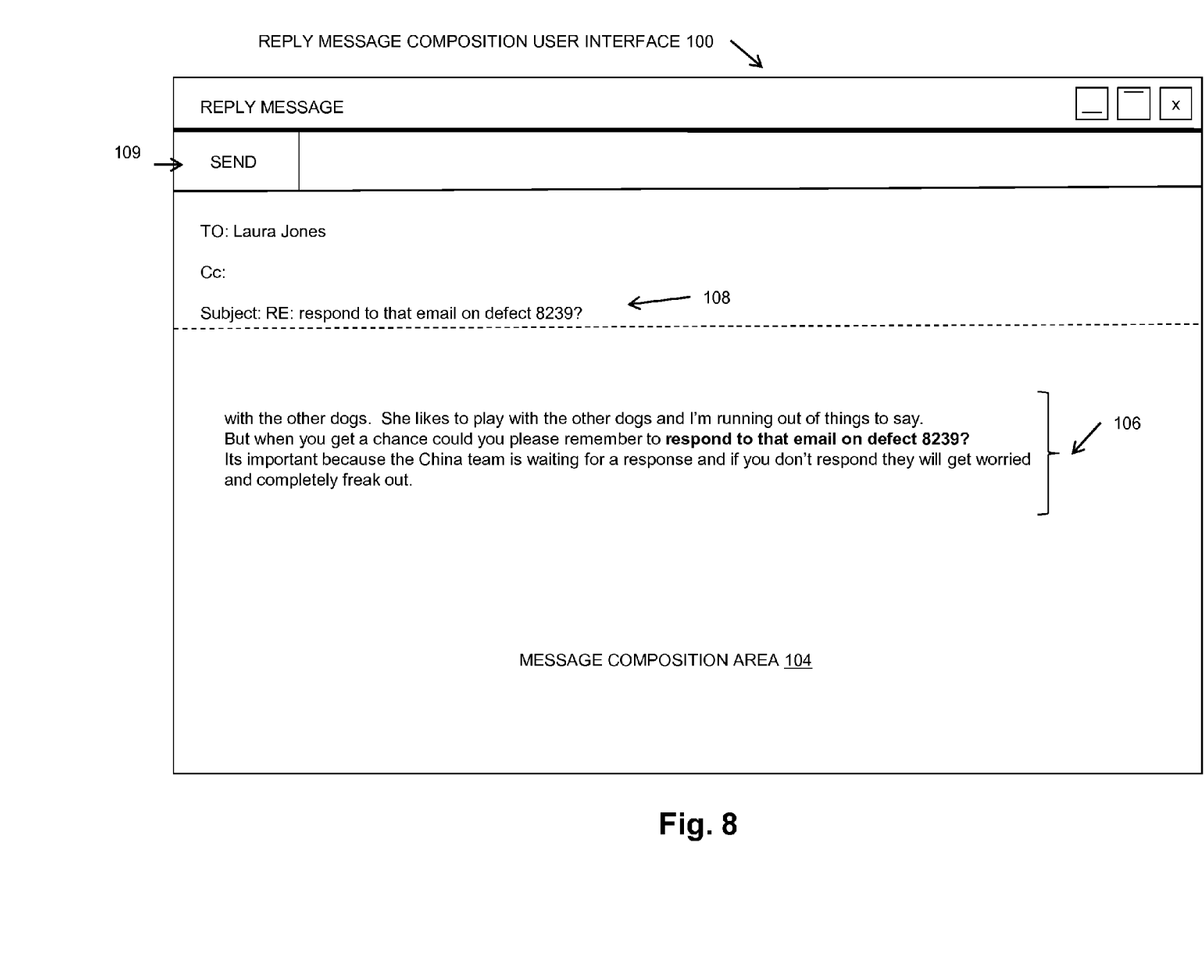
FIG. 8 is a simplified screen shot showing an example of at least a portion of a reply message composition user interface generated in an illustrative embodiment.

FIG. 8 is a simplified screen shot showing an example of at least a portion of a Reply Message Composition User Interface 100 generated in an illustrative embodiment. The Reply Message Composition User Interface 100 may also be generated in response to detecting that the recipient user has in some way selected entry 92 within the Selected Portions List 90, and/or initiated a predetermined command. For example, the disclosed system may display Reply Message Composition User Interface 100 in response to detecting that the recipient user has clicked, double-clicked or right-clicked on entry 92, and/or selected a command from a resulting context or "pop-up" menu (e.g. a "Reply" command or the like), or from any other specific type of command menu structure or the like.

As shown in FIG. 8, the Reply Message Composition User Interface 100 has a Subject: field 108 that is preloaded with the selected portion of Message 12 corresponding to entry 92 ("respond to that email on defect 8239?"), and a Message Composition Area 104 that is preloaded with that selected portion together with the contextually related content from Message 12 associated with that selected portion. No other portions of the Message 12 are pre-loaded into the Message Composition Area 104. By preloading the Subject: field 108 with the selected portion of Message 12 corresponding to entry 92, and pre-loading the Message Composition Area 104 with only the selected portion of Message 12 corresponding to entry 92 and the contextually related content for that selected portion, the disclosed system enables the recipient to respond specifically to just one selected portion of message 12 without having to address the remainder of Message 12. The recipient is then able to edit the contents of the Message Composition Area 104, for example by entering any text or other content responsive to the pre-loaded text contained in the Message Composition Area 104, and pertaining to the subject defined by the contents of the pre-loaded Subject: field 108, without having to address any other questions or content in the Message 12. When the recipient user is done responding to the selected portion of Message 12 corresponding to entry 92, he or she issues a send command, for example by clicking on the Send button 109. The disclosed system responds by transmitting a reply message having the subject "respond to that email on defect 8239?" and containing the final contents of the Message Composition Area 104, including any edits performed by the recipient user on the pre-loaded selected portion and contextually related content from Message 12 associated with the selected portion. The reply message is transmitted to the Sending Computer 10 for the sending user (e.g. Laura Jones).

Figure 9:
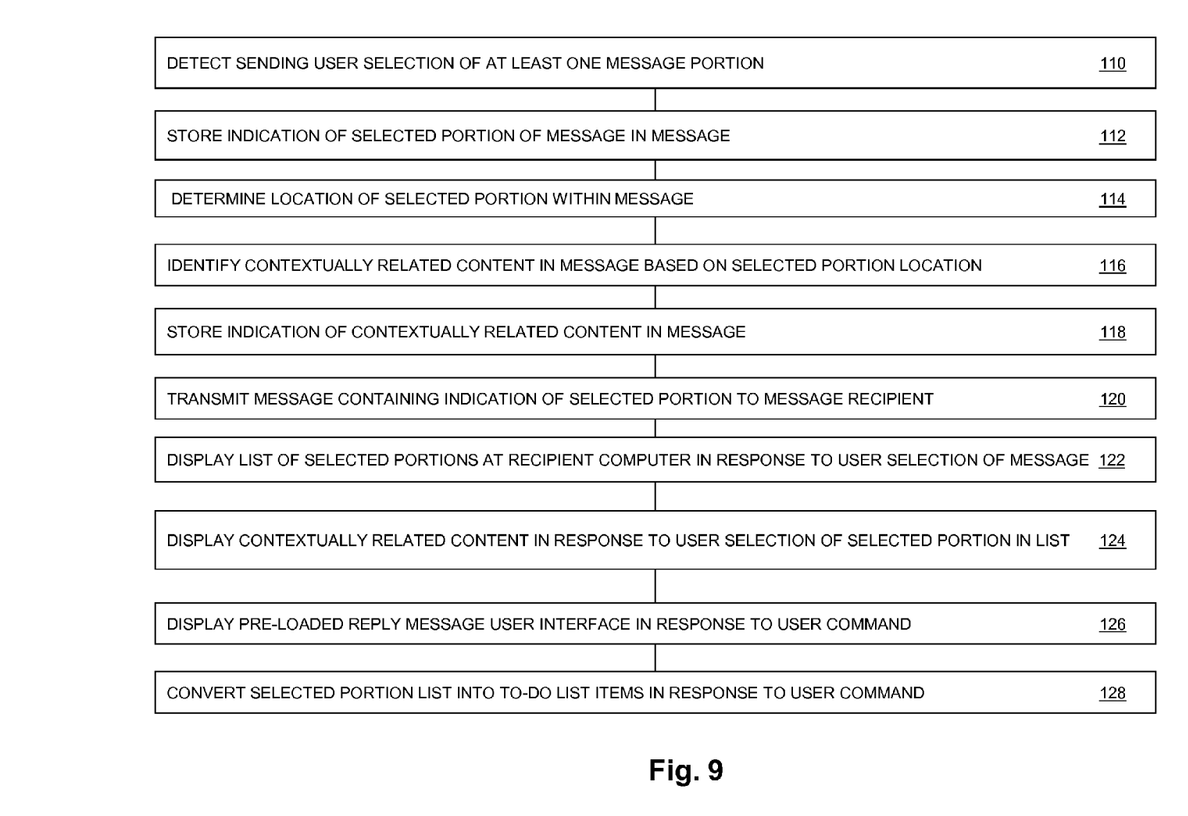
FIG. 9 is a flow chart showing steps performed during operation of an illustrative embodiment.

FIG. 9 is a flow chart showing steps performed during operation of an illustrative embodiment. Each of the steps of FIG. 9 may, for example, be performed by the Email Client Logic 30 and/or Email Client Logic 42 shown in FIG. 1. At step 110, the disclosed system detects a sending user selection of at least one message portion. See for example FIG. 4, selected portions 72, 74 and 76. At step 112, indications of the selected portions detected in step 110 are stored in a message. See for example Indications 16 of Message Portions Selected by the Sending User in FIG. 1. At step 114, the disclosed system determines the location of one of the selected portions detected at step 110 within the message. At step 116, the disclosed system identifies contextually related content within the message for the selected portion, e.g. responsive to express indication by of contextually related content by the sending user, and/or in response to one or more configuration settings provided by a sending and/or a recipient user. At step 118, indications of the contextually related content is stored in the message. See for example Indications 18 of Contextually Related Content for Message Portions Selected by the Sending user shown in FIG. 1.

At step 120 the disclosed system transmits the message containing the indications of the selected message portions and/or indications of contextually related content, to one or more recipient users. See for example Message 12 shown in FIG. 1, and FIGS. 2 and 3.

At step 122 the disclosed system displays a list of selected portions of the message on the recipient computer in response to a recipient user action. See for example Selected Portions List 90 in FIG. 6. At step 124 the disclosed system displays contextually related content in response to a recipient user selecting one of the entries in the list of selected portions. See for example Selected Portion with Contextually Related Content Window 94 in FIG. 7.

The disclosed system displays a pre-loaded reply message user interface in response to a recipient user command at step 126. See for example the Reply Message Composition User Interface 100 of FIG. 8.

Figure 6:
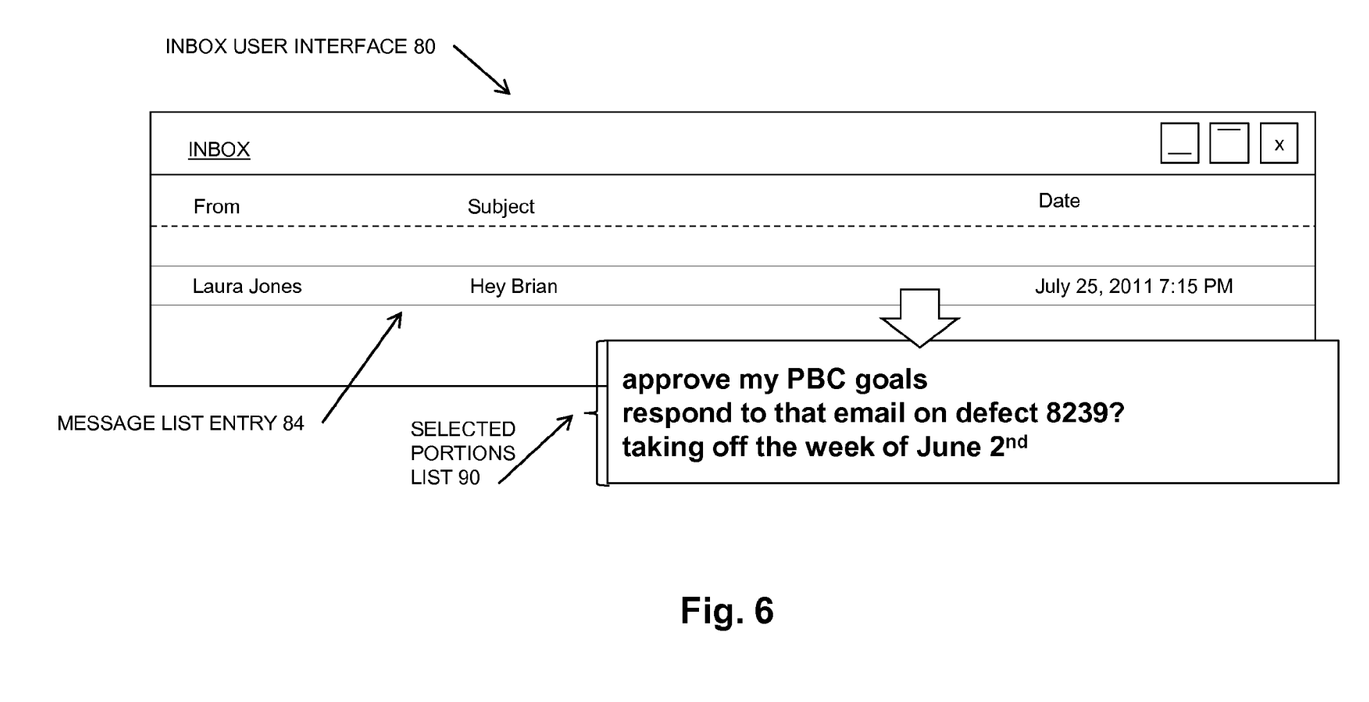
FIG. 6 is a simplified screen shot showing a second example of at least a portion of an inbox user interface generated in an illustrative embodiment.

At step 128, an embodiment of the disclosed system operates in response to a command received from a recipient user to convert the list of message portions selected by the sending user into a "to-do" list. For example, in one embodiment, each of the entries in Selected Portions List 90 are automatically copied into a separate item within a "To-Do" list available to the recipient user on the recipient computer (e.g. contained in the Memory 40 of Recipient Computer 14), in response to detection of a user command. Alternatively, each of the entries in Selected Portions List 90 may be automatically copied into one or more calendar entries within an electronic calendar application available to the recipient user on the recipient computer (e.g. contained in the Memory 40 of Recipient Computer 14), in response to detection of a user command. In such an embodiment, the disclosed system may operate to detect any dates contained in the selected message portions, and operate in response to detection of a given date by automatically bringing up the corresponding date entry in the recipient user's electronic calendar, and preloading that calendar entry with the selected portion and/or contextually related content for that selected portion.

While the description of illustrative embodiments herein includes references to an electronic mail system, the disclosed system is not limited to such an implementation or configuration. Accordingly, embodiments of the disclosed system may also be provided for other specific types of communication systems that support posting and/or exchanging electronic messages created by computer system users, such as, for example, on-line forums, discussion groups, and the like.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to one or more flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
    receiving, by a receiving computer having a display device, at least one processor and a memory communicably coupled to said processor, a message;
    locating, within said message by said receiving computer, portions of said message selected by a sending user prior to transmission of said message to said receiving computer, responsive to indications of said portions of said message selected by said sending user contained in said message, wherein said indications of said portions of said message selected by said sending user are stored within a body of said message prior to transmission of said message to said receiving computer, and wherein said portions of said message selected by said sending user are at separate locations within said body of said message;
    displaying, by said receiving computer on said display device, responsive to said indications of said portions of said message selected by said sending user stored in said body of said message, a list of entries, each entry in said list representing a corresponding one of said portions of said message selected by said sending user, wherein each entry includes a link to said corresponding one of said portions of said message selected by said sending user;
    detecting, by said receiving computer, said recipient user indicating a command; and
    in response to said detecting of said recipient user indicating said command, said receiving computer copying said list entries into one or more calendar entries within an electronic calendar application available to said recipient user on said receiving computer, detecting a date contained in one of said portions of said message selected by said sending user, automatically bringing up a date entry in said electronic calendar corresponding to said detected date contained in said one of said portions of said message selected by said sending user, and preloading said date entry in said electronic calendar with said one of said portions of said message selected by said sending user and with contextually related content within said message for said one of said portions of said message selected by said sending user.

2. The method of claim 1, wherein said entries further include at least one link to contextually related content within said message for said corresponding one of said portions of said message selected by said sending user.

3. The method of claim 2, wherein said at least one link comprises a hyperlink.

4. The method of claim 1, further comprising:
    detecting, by said receiving computer, said recipient user indicating a second command; and
    generating, by said computer in response to said detecting of said recipient user indicating said second command, an electronic to do list containing as items each of said portions of said message selected by said sending user.

5. A system comprising:
    a receiving computer including a display device, at least one processor and a memory, said memory storing program code, said program code for processing at least one received message, when executed on said processor, by
    locating, within said message by said receiving computer, portions of said message selected by a sending user prior to transmission of said message to said receiving computer, responsive to indications of said portions of said message selected by said sending user contained in said message, wherein said indications of said portions of said message selected by said sending user are stored within a body of said message prior to transmission of said message to said receiving computer, and wherein said portions of said message selected by said sending user are at separate locations within said body of said message,
    displaying, by said receiving computer on said display device, responsive to said indications of said portions of said message selected by said sending user stored in said body of said message, a list of entries, each entry in said list representing a corresponding one of said portions of said message selected by said sending user, wherein each entry includes a link to said corresponding one of said portions of said message selected by said sending user,
    detecting, by said receiving computer, said recipient user indicating a command, and
    in response to said detecting of said recipient user indicating said command, said receiving computer copying said list entries into one or more calendar entries within an electronic calendar application available to said recipient user on said receiving computer, detecting a date contained in one of said portions of said message selected by said sending user, automatically bringing up a date entry in said electronic calendar corresponding to said detected date contained in said one of said portions of said message selected by said sending user, and preloading said date entry in said electronic calendar with said one of said portions of said message selected by said sending user and with contextually related content within said message for said one of said portions of said message selected by said sending user.

6. The system of claim 5, wherein said entries further include at least one link to contextually related content within said message for said corresponding one of said portions of said message selected by said sending user.

7. The system of claim 6, wherein said at least one link comprises a hyperlink.

8. The system of claim 5, further comprising:
    wherein said program code for processing at least one received message further processes said received message by
    detecting, by said receiving computer, said recipient user indicating a second command; and
    generating, by said computer in response to said detecting of said recipient user indicating said second command, an electronic to do list containing as items each of said portions of said message selected by said sending user.

9. A non-transitory computer program product, comprising:
- at least one computer readable storage medium having program code embodied thereon for, when executed on at least one computer having a processor, memory, and display device, processing at least one received message, the program code comprising
- program code for receiving, by a receiving computer having a display device, at least one processor and a memory communicably coupled to said processor, a message;
- program code for locating, within said message by said receiving computer, portions of said message selected by a sending user prior to transmission of said message to said receiving computer, responsive to indications of said portions of said message selected by said sending user contained in said message, wherein said indications of said portions of said message selected by said sending user are stored within a body of said message prior to transmission of said message to said receiving computer, and wherein said portions of said message selected by said sending user are at separate locations within said body of said message;
- program code for displaying, by said receiving computer on said display device, responsive to said indications of said portions of said message selected by said sending user stored in said body of said message, a list of entries, each entry in said list representing a corresponding one of said portions of said message selected by said sending user, wherein each entry includes a link to said corresponding one of said portions of said message selected by said sending user;
- program code for detecting, by said receiving computer, said recipient user indicating a command; and
- program code for, in response to said detecting of said recipient user indicating said command, said receiving computer copying said list entries into one or more calendar entries within an electronic calendar application available to said recipient user on said receiving computer, detecting a date contained in one of said portions of said message selected by said sending user, automatically bringing UP a date entry in said electronic calendar corresponding to said detected date contained in said one of said portions of said message selected by said sending user, and preloading said date entry in said electronic calendar with said one of said portions of said message selected by said sending user and with contextually related content within said message for said one of said portions of said message selected by said sending user.

10. The computer program product of claim 9, wherein said entries further include at least one link to contextually related content within said message for said corresponding one of said portions of said message selected by said sending user.

11. The computer program product of claim 10, wherein said at least one link comprises a hyperlink.

12. The computer program product of claim 9, said program code further comprising:
- program code for detecting, by said receiving computer, said recipient user indicating a second command; and
- program code for generating, by said computer in response to said detecting of said recipient user indicating said second command, an electronic to do list containing as items each of said portions of said message selected by said sending user.

* * * * *